United States Patent
Chiba et al.

[11] Patent Number: 5,976,668
[45] Date of Patent: Nov. 2, 1999

[54] BASE FILM FOR MAGNETIC RECORDING MEDIUM AND MAGNETIC RECORDING MEDIUM USING SAME

[75] Inventors: Kazunobu Chiba; Jota Ito; Tsutomu Takeda; Shinichi Matsumura, all of Miyagi, Japan

[73] Assignee: Sony Corporation, Tokyo, Japan

[21] Appl. No.: 08/920,568

[22] Filed: Aug. 29, 1997

Related U.S. Application Data

[63] Continuation-in-part of application No. 08/607,564, Feb. 27, 1996, abandoned.

[30] Foreign Application Priority Data

Feb. 28, 1995 [JP] Japan .................................. 7-040901

[51] Int. Cl.⁶ .................................................. G11B 5/704
[52] U.S. Cl. .......................... 428/141; 428/212; 428/457; 428/694 SG; 428/694 TR; 428/900
[58] Field of Search ................................. 428/141, 212, 428/457, 694 SG, 694 TR, 900

[56] References Cited

U.S. PATENT DOCUMENTS

| | | | |
|---|---|---|---|
| 4,670,319 | 6/1987 | Katoh et al. | 428/141 |
| 4,720,412 | 1/1988 | Katoh et al. | 428/141 |
| 4,840,830 | 6/1989 | Sakamoto et al. | 428/141 |
| 4,910,068 | 3/1990 | Takagi et al. | 428/141 |
| 5,051,292 | 9/1991 | Katoh et al. | 428/141 |
| 5,284,699 | 2/1994 | Nishino et al. | 428/217 |
| 5,318,823 | 6/1994 | Utsumi et al. | 428/143 |
| 5,328,745 | 7/1994 | Kurihara et al. | 428/141 |
| 5,364,684 | 11/1994 | Sakamoto et al. | 428/141 |
| 5,366,783 | 11/1994 | Utsumi et al. | 428/141 |
| 5,429,855 | 7/1995 | Kotani et al. | 428/141 |
| 5,516,574 | 5/1996 | Ogawa et al. | 428/143 |

*Primary Examiner*—Stevan A. Resan
*Attorney, Agent, or Firm*—Hill & Simpson

[57] ABSTRACT

A base film for a magnetic recording medium including one surface, on which a magnetic layer can be formed, having a surface roughness of center line average roughness Ra of 10 nm or less, a ten-point average roughness Rz of 80 nm or less and a maximum height Rmax of 150 nm or less. The base film includes the other surface having a surface roughness of center line average roughness Ra of 4.5 to 20 nm, a ten-point average roughness Rz of 35 to 350 nm and a maximum height Rmax of 40 to 400 nm.

13 Claims, 1 Drawing Sheet

BASE FILM FOR MAGNETIC RECORDING MEDIUM AND MAGNETIC RECORDING MEDIUM USING SAME

This is a continuation-in-part, of application Ser. No. 08/607,564, Feb. 27, 1996 now abandoned.

BACKGROUND OF THE INVENTION

1. Field of the Invention

This invention relates to a base film for use in a so-called vacuum-deposited magnetic tape, and a magnetic recording medium using the base film.

2. Prior Art

As a high density magnetic recording medium, there is known a magnetic recording medium composed of a non-magnetic support and a ferromagnetic metal thin film formed thereon by physical deposition, such as vacuum deposition or sputtering, or plating.

For example, a magnetic tape on which cobalt (Co) is deposited is disclosed in Japanese patent application laid-open publication No. 147,010/79, and a perpendicular magnetic recording medium using an alloy of cobalt and chromium (Cr) is disclosed in Japanese patent application laid-open publication No. 134,706/77.

The thin film formed by the thin-film formation method, such as vacuum deposition, sputtering or ion plating, is as thin as 1.5 μm or less, and in spite of its thinness, it has magnetic characteristics similar to or higher than those of a coating type magnetic recording medium provided with a magnetic recording layer having a thickness of 3 μm or more. The coating type magnetic recording medium is composed of a base film and a magnetic layer coated on the base film and formed of a mixture of magnetic powder and an organic polymer binder.

In addition, there is the idea that magnetic characteristics such as Hc (coercive force) or remanence ratio of a hysteresis loop doesn't depend on the surface conditions of the base film. As an example of this idea, U.S. Pat. No. 3,787,327 revealed multi-layer structure of Co—Cr formed by vacuum deposition.

On the other hand, a metal thin film magnetic recording medium has such a disadvantage that roughness (surface irregularities) of the base film appears on a metal thin film having an extremely thin thickness, resulting in producing noise upon information reproduction.

In preventing the production of noise, it is desirable that the base film have a surface as smooth as possible. On the other hand, from the aspect of handling, such as winding and unwinding of the base film, the surface of the base film should be rough to some extent since an exceedingly smooth surface of the base film causes deterioration of performance in terms of slippage between adjacent portions thereof, resulting in occurrence of so-called blocking which makes it impossible to use it as a commercial product. Accordingly, the surface of the base film is required to have a certain roughness.

As mentioned above, in a metal thin film-type magnetic recording medium, the smooth surface of the base film is required from the aspect of electromagnetic transducing characteristics. On the other hand, the rough surface is required from the aspect of handling. In the end, the above-mentioned base film must satisfy these two contradictory characteristics.

Further, in the metal thin film magnetic recording medium, travelling ability of the surface on a metal thin film side is important in a practical use. In the case of the coating type magnetic recording medium, for example, the travelling ability is improved by adding a lubricant in a binder. However, such countermeasures are not applicable to a metal thin film magnetic medium. It is, therefore, much difficult to keep a stable travelling ability, and particularly, extremely difficult under high-temperature and high-humidity conditions.

In order to solve the problem, it has been proposed that fine projections be formed on the surface of a base film by employing a fine powder, water-soluble resin and silane coupling agents, as disclosed in Japanese patent laid-open patent publication No. 30,105/87. It has been also proposed that fine projections be formed on the surface of a base film by employing a fine powder and water-soluble resin, as disclosed in Japanese patent application laid-open publications Nos. 30,106/87 and 229,316/84.

As mentioned above, the roughness of the base film surface on which a magnetic layer can be formed is controlled in order to optimize the roughness of the surface of a metal thin film. However, the surface on the other side (the so-called back surface) has not been considered since it is the surface on which the magnetic layer can be formed that has been of primary concern. A surface having a center line average roughness Ra of approximately 4 nm, a ten-point average roughness of approximately 30 nm and a maximum height Rmax of 40 nm is usually considered "a relatively good surface" for the back surface only to prevent the back surface from suffering from deterioration by heat. Heat deterioration, here, means damage and deformation of a base film caused by the heat produced during the formation of a magnetic metal thin film by vacuum deposition. This is because, for example, in the case of applying vacuum deposition, a magnetic metal beam which is produced by the evaporation of magnetic metals is applied.

The roughness of the back surface, which contacts a guide roll in the production process of the film and the magnetic recording medium, largely influences travelling ability. Further, in the case of the above-mentioned relatively good surface, the travelling ability becomes unstable resulting in an increase in production costs of both the base film and magnetic recording medium.

OBJECT AND SUMMARY OF THE INVENTION

It is, therefore, an object of the present invention to provide a base film for a magnetic recording medium having an excellent, stable travelling ability and low production costs.

It is another object of the present invention to provide a magnetic recording medium which provides an improved deposition rate without deterioration of the electromagnetic transducing characteristic.

In order to accomplish the above objects, intense research on the surface of a base film for a magnetic recording medium has been conducted. As a result, the inventors have found that the roughness of a back surface to some extent largely contributes to a stable travelling ability without suffering from heat deterioration in the process of forming a ferromagnetic metal thin film.

The present invention is completed based on the research mentioned above.

Accordingly, the base film of the present invention has not only one surface on which magnetic layer can be formed but also the other surface (a back surface) optimized from the aspect of a stable travelling ability.

Since the back surface can be defined by its so-called surface roughness, the present invention is characterized by a center line average roughness Ra of 4.5 to 20 nm, a ten-point average roughness Rz of 35 to 350 nm and a maximum height Rmax of 40 to 400 nm. Rmax is the difference between the highest peak level and the lowest valley level. Rz is the distance between the average level of the highest five peaks and the average level of the five lowest or deepest valleys.

The surface on which a magnetic layer can be formed can also be defined by the surface roughness, and further can be also defined by the height and density of fine projections. In either case, it should be optimized from the aspect of the electromagnetic transducing performance and travelling ability of a ferromagnetic metal thin film formed on the surface. In the former case, it is preferred that a center line average roughness Ra of 10 nm or less, ten-point average roughness Rz of 80 nm or less and a maximum height Rmax of 150 nm or less. In the latter case, it is preferred that fine projections of a height of 40 to 100 nm with a density of $0.5 \times 10^4$ to $10 \times 10^4$ per $mm^2$ and fine projections of a height of 15 to 35 nm with a density of $10 \times 10^4$ to $5,000 \times 10^4$ per $mm^2$.

A base film of the present invention is used as a base film of a metal thin film magnetic recording medium. Specifically, the base film is used to produce a magnetic recording medium having thereon a ferromagnetic metal thin film formed by a vacuum thin film forming method, such as vapor vacuum deposition, spattering, ion plating, etc.

Though it had been considered that a back surface should be a relatively good surface because of the heat deterioration in the process of vacuum vapor deposition of a metal thin film, it was found that a metal thin film can also be formed on a surface which is rough to some extent as a result of various examples. Based on results of such examples, the present invention provides an optimized condition of a back surface and an excellent travelling ability without suffering from a heat deterioration by controlling the surface roughness in the range defined by the present invention.

On the other hand, by controlling the surface roughness, or height of fine projections and their density on the surface of a base film on which a magnetic layer can be formed in the range defined by the present invention, both a good electromagnetic transducing characteristic of a ferromagnetic metal thin film which is formed on the base film, and a good travelling ability of the ferromagnetic metal thin film are achieved. In this case, the travelling ability includes, for example, that of the ferromagnetic metal thin film on a magnetic head.

DETAILED DESCRIPTION OF THE PREFERRED EMBODIMENT

Figure 1:
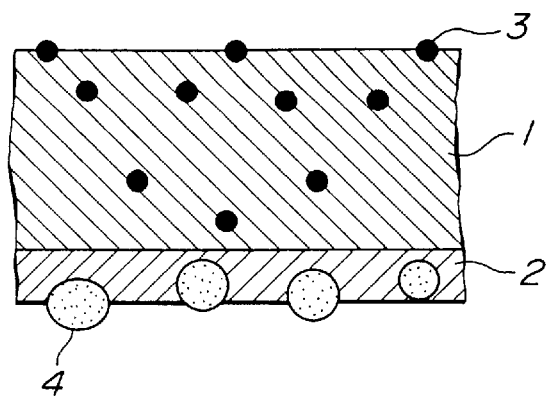
FIG. 1 is a schematic cross sectional view showing one embodiment of a base film according to the present invention.

A base film for a magnetic recording medium and the magnetic recording medium itself, according to the present invention, are described in more detail by way of the preferred embodiment by referring to the accompanying drawings and results of examples. Composition of a base film Resin of which a base film is made may be a saturated linear polyester which is synthesized with aromatic dibasic acid or its ester derivative, and diol or its ester derivative. The preferred examples of such polyester includes polyethylene terephthalate, polyethylene isophthalate, poly tetramethylene terephthalate, poly (1,4-cyclohexylene dimethylene terephthalate), polyethylene-2,6-naphthalene dicarboxylate and the like, their copolymers and their mixture with a small amount of other resins.

Such polyester can be produced by known methods. For example, polyethylene terephthalate may be made by the esterification of terephthalic acid and ethylene glycol or ester interchange reaction of dimethyl terephthalate and ethylene glycol, followed by polycondensation of the products of the above-mentioned reaction. In the process, known catalysts are available but organotitanic compounds are preferred for catalyst polycondensation from the aspect of the characteristics of a produced film.

Accordingly, additive substances to make a surface coarse, such as calcium carbonate, kaolinite, titanium dioxide, silica, alumina and the like, can be mixed into the polymer so long as the quantity does not spoil the objects of the present invention.

The above-mentioned polyester is formed into a film by a series of processes: normal melt extrusion, biaxial orientation and annealing. A biaxial orientation can be conducted by the method such as sequential biaxial orientation, biaxial co-extrusion and the like. Biaxially oriented polyester film has crystal orientation which causes the film to have a heat fusion of 4 cal or more per gram by a differential scanning calorimeter at a heating rate of 10° C./min. The thickness of the film is generally 3 to 100 $\mu$m, and preferably 4 to 50 $\mu$m.

In the present invention, the above-mentioned base film includes one side surface on which a magnetic layer can be formed, having a surface roughness of center line average roughness Ra of 10 nm or less, a ten-point average roughness Rz of 80 nm or less and a maximum height Rmax of 150 nm or less, and the other side surface having a surface roughness of center line average roughness Ra of 4.5 to 20 nm, a ten-point average roughness Rz of 35 to 350 nm and a maximum height Rmax of 40 to 400 nm.

It is preferred that the above-mentioned base film includes one side surface on which a magnetic layer can be formed, having a surface roughness of center line average roughness Ra of 6.0 nm or less, a ten-point average roughness Rz of 35 nm or less and a maximum height Rmax of 40 nm or less, and the other side surface having a surface roughness of center line average roughness Ra of 7.0 to 20 nm, a ten-point average roughness Rz of 80 to 350 nm and a maximum height Rmax of 100 to 400 nm.

Accordingly, the base film has one side surface on which a magnetic layer can be formed, has fine projections of a height of 40 to 100 nm with a density of $0.5 \times 10^4$ to $10 \times 10^4$ per $mm^2$ and fine projections of a height of 15 to 35 nm with a density of $10 \times 10^4$ to $5,000 \times 10^4$ per mm, and the other side surface having a surface roughness of center line average roughness Ra of 4.5 to 20 nm, a ten-point average roughness Rz of 35 to 350 nm and a maximum height Rmax of 40 to 400 nm.

The surface conditions of a base film are controlled by a method such as mixing a filler, such as silica ($SiO_2$), in a polyester composing the base film, and producing an anchor layer having fine projections or wrinkles on the surface. The same method may be conducted on the back surface.

Figure 2:
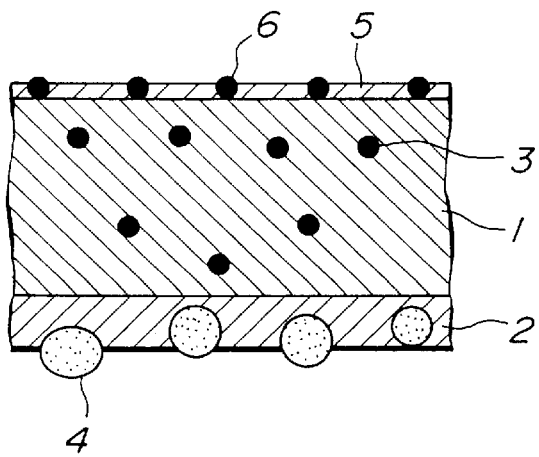
FIG. 2 is a schematic cross sectional view showing another embodiment of a base film according to the present invention.
Figure 3:
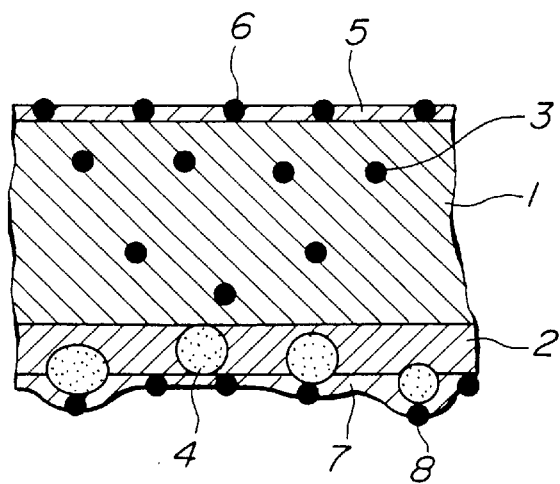
FIG. 3 is a schematic cross sectional view showing still another embodiment of a base film according to the present invention.

The basic composition of the base film is shown in FIGS. 1, 2 and 3.

FIG. 1 shows a base film having a two-layer structure produced by a method such as co-extrusion or the like where a fine particle 3 is mixed in a base layer 1 on which a magnetic layer is formed and a relatively large particle 4 is mixed in a base layer 2 on the back surface. A silica ($SiO_2$) powder and an organic filler are used for the small particle 3 and the relatively large particle 4. The diameter of the particles 3 preferably ranges from about 80 nm to about 120 nm. The density of the particles 3 in the base layer 1 ranges from about 10,000 to about 30,000 particles per square millimeter (10,000–30,000/mm$^2$). The larger particles 4 in the back base layer 2 have a diameter that ranges from 25 nm to 600 nm and the density of the particles 4 in the base layer 2 can range from 5,000,000 to 80,000,000 particles per square millimeter (5,000,000–80,000,000/mm$^2$).

FIG. 2 shows a base film where the anchor layer 5 containing a fine particle 6 is formed on the surface of the base film shown in FIG. 1. The diameter of the particles 6 disposed in the anchor layer 5 preferably ranges from 12 nm to 25 nm. The density of the particles 6 in the anchor layer 5 preferably ranges from 5,000,000 to 20,000,000 per square millimeter (5,000,000–20,000,000/mm$^2$).

FIG. 3 shows a base film where the anchor layer 7 is further formed on the back surface of the base film shown in FIG. 2.

Composition of metal thin film recording medium

A metal thin film recording medium may be produced by forming a ferromagnetic metal thin film on the surface of one of the above-mentioned base films on which the thin film can be formed by a vacuum thin film forming method, such as vacuum evaporation, sputtering, ion plating or the like.

In addition to cobalt (Co), a metal such as iron (Fe), nickel (Ni) or the like, a ferromagnetic metal for plane magnetic recording such as a Co—Ni series metal, Co—Ni—Pt series alloy, Fe—Co—Ni series alloy, Fe—Ni—B series alloy, Fe—Co—B series alloy, Fe—Co—Ni—B series alloy or the like, and a ferromagnetic metal for perpendicular magnetic recording such as a Co—Cr series alloy, Co—Oxygen (O) series metal or the like, are used for a ferromagnetic metal thin film.

EXAMPLES

Examples 1 to 10 and Comparative Examples 1 to 4

A metal thin film was deposited on a base film of polyethylene terephthalate (PET) with a thickness of 10 mm in a vacuum deposition device at a pressure of $10^{-9}$ atm by heating the Co—Ni series alloy in a crucible with an electron beam. The base film was guided along the surface of a metal roll with a diameter of 1 m. The angle of incidence of deposition was 45 to 90 degrees relative to a normal line of the base film, whose winding velocity was 25 m/min. The strength of the electron beam was controlled so that the thickness of the deposited ferromagnetic metal thin film became 200 nm.

The electromagnetic transducing characteristics and friction coefficient of the back surface of sample tapes made from base films having various surface roughnesses on the surface on which a magnetic layer can be formed and on the back surface, by the above-mentioned method, were measured. Accordingly, the following methods were used for measuring the surface roughness of the surface on which a magnetic layer can be formed and the back surface, height of projections, density thereof, and electromagnetic transducing characteristics.

Number of projections

Measurement of the number of projections on the surfaces of the film was conducted by a scanning electron microscope. The number of fine projections which grew around a core of a fine particle was measured at a magnification of 20,000 to 50,000 and the number of fine projections which grew on the resin at a magnification of 10,000 to 20,000.

Height and density of fine projections

The height of the fine projections was measured by a three-dimensional roughness meter making use of a tunnel current (a scanning tunnel electron microscope). The voltage applied between the surface of a sample, on which gold was uniformly deposited with a thickness of 200 angstroms, and a metal probe was 0.8 V and the tunnel current was set 0.5 nA. The heights of the projections in a 2 mm square were counted one by one in open air and the average height of 20 projections was taken as the height of the projections. Their density was measured by the number of projections in 5 $\mu$m×5 $\mu$m.

Electromagnetic transducing characteristics

The electromagnetic transducing characteristics were measured by using a modified device (an EVS-900 8-mm VCR from SONY CORP.). The record current was set for the current at which the largest output could be obtained for each sample. They were assessed as excellent (○) for the value of Y—C/N from 0 to ±2 dB, as good (Δ) for −2 to −4 dB, and as bad (×) for −4 dB or less under the condition that the value in comparison 1 was 0 dB. The values were set by the average of three measurements.

Surface roughness

The center line roughness Ra was measured based on the JIS B0601 standard using a highly precise surface roughness meter (the SE-3FAT from Kosaka Research Laboratory). After recording a chart under the measurement conditions of a probe with a radius of 2 $\mu$m, a load of 30 mg, a magnification of 200,000 and a cutoff of 0.08 mm, a part of the roughness curve in the chart in a range of measuring distance L in the direction of the center line was taken into account. Considering the center line as an X axis and its vertical direction as a Y axis in part of the curve, the curve was expressed by the following equation.

$$Ra = \frac{1}{L}\int_0^L |f(x)|\, dx$$

The value given by equation 1 in nm was considered as the surface roughness. The value was decided by averaging fifty measurements for the standard length of 0.5 mm.

The results of the examples and comparative examples are shown in tables 1 and 2.

TABLE 1

| | | | | Condition of Deposited Surface | | | |
|---|---|---|---|---|---|---|---|
| | | | | LP(4) | | SP(5) | |
| Ex. No. | Ra(1) (nm) | Rz(2) (nm) | Rmax(3) (nm) | Height (nm) | Dens. (× 10$^4$/ mm$^2$) | Height (nm) | Dens. (× 10$^4$/ mm$^2$) |
| Com. Ex. 1 | 5.0 | 24 | 28 | 70 | 2.0 | 25 | 700 |
| Com. Ex. 2 | 4.0 | 20 | 25 | 72 | 1.8 | 26 | 600 |

TABLE 1-continued

| | | | | Condition of Deposited Surface | | | |
|---|---|---|---|---|---|---|---|
| | | | | LP(4) | | SP(5) | |
| Ex. No. | Ra(1) (nm) | Rz(2) (nm) | Rmax(3) (nm) | Height (nm) | Dens. ($\times 10^4$/ mm$^2$) | Height (nm) | Dens. ($\times 10^4$/ mm$^2$) |
| Com. Ex. 3 | 6.0 | 28 | 35 | 70 | 1.8 | 22 | 800 |
| Ex. 1 | 5.0 | 24 | 28 | 70 | 1.8 | 22 | 750 |
| Ex. 2 | 5.0 | 24 | 28 | 50 | 2.8 | 22 | 2000 |
| Ex. 3 | 5.1 | 27 | 29 | 50 | 5.0 | 20 | 4000 |
| Ex. 4 | 6.4 | 36 | 39 | 70 | 4.8 | 30 | 800 |
| Ex. 5 | 6.2 | 37 | 42 | 70 | 4.8 | 25 | 700 |
| Ex. 6 | 7.0 | 41 | 44 | 75 | 2.0 | 30 | 1200 |
| Ex. 7 | 4.0 | 22 | 26 | 72 | 1.9 | 26 | 600 |
| Ex. 8 | 5.0 | 25 | 28 | 70 | 1.9 | 25 | 700 |
| Ex. 9 | 6.0 | 34 | 39 | 70 | 1.8 | 22 | 800 |
| Ex. 10 | 4.0 | 21 | 29 | 50 | 3.0 | 22 | 3000 |
| Com. Ex. 4 | 4.0 | 22 | 26 | 72 | 1.8 | 26 | 700 |

Note:
(1) Ra indicates "center line average roughness."
(2) Rz indicates "ten-point average roughness."
(3) Rmax indicates "maximum height."
(4) LP indicates "large projection."
(5) SP indicates "small projection."

TABLE 2

| | Condition of Back Surface | | | | |
|---|---|---|---|---|---|
| Ex. No. | Ra (1) (nm) | Rz (2) (nm) | Rmax (3) (nm) | Film F.C. (4) | E.T.C. (5) |
| Com. Ex. 1 | 4.4 | 38 | 41 | x | ○ |
| Com. Ex. 2 | 4.0 | 35 | 38 | x | ○ |
| Com. Ex. 3 | 3.8 | 30 | 36 | x | ○ |
| Ex. 1 | 5.5 | 40 | 45 | Δ~○ | ○ |
| Ex. 2 | 5.6 | 41 | 49 | Δ~○ | ○ |
| Ex. 3 | 5.5 | 40 | 46 | Δ~○ | Δ~○ |
| Ex. 4 | 10 | 170 | 286 | ○ | Δ |
| Ex. 5 | 11 | 270 | 350 | ○ | Δ |
| Ex. 6 | 15 | 300 | 360 | ○ | Δ |
| Ex. 7 | 10 | 170 | 290 | ○ | ○ |
| Ex. 8 | 18 | 340 | 380 | ○ | ○ |
| Ex. 9 | 15 | 310 | 350 | ○ | ○ |
| Ex. 10 | 7.0 | 180 | 100 | ○ | ○ |
| Com. Ex. 4 | 20 | 370 | 410 | ○ | Δ~x |

Note:
(1) Ra indicates "center line average roughness."
(2) Rz indicates "ten-point average roughness."
(3) Rmax indicates "maximum height."
(4) LP indicates "large projection."
(5) SP indicates "small projection."
(6) Film F.C. indicates "film friction coefficient," and ○, Δ and x indicate excellent, good and bad, respectively.
(7) E.T.C. indicates "electromagnetic transducing characteristics," and ○, Δ and x indicate excellent, good and bad, respectively.

As is clearly shown in the tables, if the back surface is too flat (Comparative Examples 1, 2 and 3), the friction coefficient of the back surface is high resulting in a bad travelling ability. On the other hand, if the back surface is too rough (Comparative Example 4), heat deterioration was generated with the vapor deposition of a ferromagnetic metal thin film in addition to bad electromagnetic transducing characteristics.

On the other hand, the tape using a base film having a surface roughness according to the present invention has not only a stable travelling ability which makes high-speed travelling but also excellent electromagnetic transducing characteristics.

As mentioned above, since the base film according to the present invention has a back surface having the proper roughness, the travelling ability upon the film formation is much stable, resulting in a high yield and high productivity. As a result, production costs of the base film can be reduced.

Further, the magnetic recording medium according to the present invention not only has excellent electromagnetic transducing characteristics and travelling ability on a magnetic head but also can improve the film formation velocity of a ferromagnetic metal thin film, which is desirable from the aspect of the production costs.

Example of Film Formation: Double Layered Film

For the formation of film, the layer 1 (the side with evaporated tape surface) and the layer 2 (the side with back coat) were first prepared. The layer 1 material is non-oriented, uncrystallized PET having a least possible amount of particles formed by the residue from polymerization and catalyzation, and containing 0.05 weight % of $SiO_2$ particles of 100 nm in grain diameter. The layer 2 material is non-oriented, uncrystallized PET having a least possible amount of particles formed by the residue from polymerization and catalyzation being minimized, and containing 0.1 weight % of $SiO_2$ particles of 600 nm in grain diameter.

Both the layer 1 and 2 materials were then melted and extruded on a rotating drum with its temperature maintained at 20° C. approximately; and stretched successively to 3.4 times in the longitudinal direction at 90° C. and also to 3.4 times in the transverse direction at 105° C. Further, a heat-treatment was given at 20° C. approximately. The final thickness of the layer 1 was 20 nm and the total film thickness came to 10,000 nm.

During this film formation, that is, after the stretch in the longitudinal direction and before the stretch in the transverse direction, the coating solution consisting of the following ingredients was applied over the film surface on the magnetic layer by the roll-coat method.

Ingredients:

acrylic-polyester resin 82.5% polymethacrylate methyl fine particles of 30 nm in diameter (1.1 weight % solution) 2.5% polyoxyethylene nonylphenel ether (1.5 weight % solution) 15%

The amount of filters added to PET (weight % to PET) is as follows:

Layer 1: 10 nm to 200 nm in particle diameter; 0.01–0.1% added.

Layer 2: 100 nm to 800 nm in particle diameter; 0.1–1% added.

Polyethylene terephthalate (PET) can be formed through a conventional method: first by ester exchange between terephthalate and ethylene glycol or between dimethyl terephthalate and ethylene glycol; then by polycondensating the reacted substance.

This polyester is then melted and extruded with an ordinary method, stretched and oriented either successively or simultaneously in the two directions (longitudinal and transverse directions at right angles), and given a heat-treatment, resulting in the formation of film.

One method of forming continuous coat on the surface of PET is to apply, dry and harden a coating solution containing fine particles of resin (preferably a water-base solution) on PET film during its formation. Another method is to apply, dry and harden a coating solution on PET film having already been oriented in the two directions. The former method is, however, preferable.

A large protrusion on the surface of film is one that contains inactive particles in PET. Inactive fine particles are such inorganic fine grained particles as calcium carbonate, titanium dioxide, alumina, and silica; and such organic fine grained particles as polystyrene, polymethyl methacrylate, methyl methacrylate copolymer, cross-linked methyl methacrylate copolymer, polytetrafluoroethylene, polyvynylidene fluoride, polyacrylonitrile, and benzoguanamine resins. Among them, the use of colloidal silica in the former inorganic group and cross-link high polymers in the latter organic group is, however, preferable in order to obtain spherical particles.

These substances, creating a rough surface, can be added during the manufacturing of PET if a good dispersion condition is obtained in the PET film. Or, they can be added to and mixed with polymer being melted, using an extruder directing the film in one direction or the other direction, or using another extruder having a bent structure, during the manufacturing of PET. IF such substances are added during the manufacturing process of PET, it is preferable to carry out the addition at the stage before and during the polymerization, considering the dispersion of particles.

What is claimed is:

1. A base film for a magnetic recording medium that contacts a guide roll during processing the base film comprising:

a first surface, on which a magnetic layer is formed, the first surface having a surface roughness comprising a center line average roughness Ra of 10 nm or less, a ten-point average roughness Rz of 80 nm or less and a maximum height Rmax of 150 nm or less, the first surface further comprising a plurality of first fine projections having a first height ranging from 80 to 120 nm and a density ranging from 10,000 to 30,000 per mm$^2$, and a plurality of second fine projections of a second height ranging from 15 to 35 nm with a second density of $10\times10^4$ to $5,000\times10^4$ particles per mm$^2$; and a second back surface, which contacts the guide roll, having a surface roughness comprising a center line average roughness Ra of 4.5 to 20 nm, a ten-point average roughness Rz of 35 to 350 nm and a maximum height Rmax of 100 to 400 nm.

2. The base film of claim 1 wherein the center line average roughness Ra of the first surface is 6.0 nm or less, the ten-point average roughness Rz of the first surface is 40 nm or less and the maximum height Rmax of the first surface is 40 nm or less.

3. The base film of claim 1 wherein the center line average roughness Ra of the back surface ranges from 7.0 to 20 nm, the ten-point average roughness Rz of the back surface ranges from 80 to 350 nm.

4. The base film of claim 1 wherein the center line average roughness Ra of the first surface is 6.0 nm or less, the ten-point average roughness Rz of the first surface is 40 nm or less and the maximum height Rmax of the first surface is 40 nm or less, and wherein the center line average roughness Ra of the back surface ranges from 7.0 to 20 nm, the ten-point average roughness Rz of the back surface ranges from 80 to 350 nm.

5. The base film of claim 1 wherein the back surface further comprises a plurality of fine projections having a height ranging from 25 to 600 nm and a density ranging from 5,000,000 to 80,000,000 per mm$^2$.

6. The base film of claim 1 wherein the back surface further comprises a plurality of fine projections having a height ranging from 25 to 600 nm and a density ranging from 5,000,000 to 80,000,000 per mm$^2$.

7. A base film for a magnetic recording medium that contacts a guide roll during processing the base film comprising:

a first surface, on which a magnetic layer is formed, the first surface having a surface roughness comprising a center line average roughness Ra of 10 nm or less, a ten-point average roughness Rz of 80 nm or less and a maximum height Rmax of 150 nm or less, the first surface having a plurality of first fine projections of a first height ranging from 40 to 100 nm with a first density of $0.5\times10^4$ to $10\times10^4$ particles per mm$^2$ and a plurality of second fine projections of a second height ranging from 15 to 35 nm with a second density of $10\times10^4$ to $5,000\times10^4$ particles per mm$^2$; and a second back surface, which contacts the guide roll, having a surface roughness comprising a center line average roughness Ra of 4.5 to 20 nm, a ten-point average roughness Rz of 35 to 350 nm and a maximum height Rmax of 100 to 400 nm.

8. The base film of claim 7 wherein the center line average roughness Ra of the first surface is 6.0 nm or less, the ten-point average roughness Rz of the first surface is 40 nm or less and the maximum height Rmax of the first surface is 40 nm or less.

9. The base film of claim 7 wherein the center line average roughness Ra of the back surface ranges from 7.0 to 20 nm, the ten-point average roughness Rz of the back surface ranges from 80 to 350 nm.

10. The base film of claim 7 wherein the center line average roughness Ra of the first surface is 60 nm or less, the ten-point average roughness Rz of the first surface is 40 nm or less and the maximum height Rmax of the first surface is 40 nm or less, and wherein the center line average roughness Ra of the back surface ranges from 7.0 to 20 nm, the ten-point average roughness Rz of the back surface ranges from 80 to 350 nm.

11. The base film of claim 7 wherein the first surface further comprises a plurality of third fine projections having a third height ranging from 80 to 120 nm and a density ranging from 10,000 to 30,000 per mm$^2$.

12. The base film of claim 7 wherein the back surface further comprises a plurality of fine projections having a height ranging from 25 to 600 nm and a density ranging from 5,000,000 to 80,000,000 per mm$^2$.

13. The base film of claim 7 wherein the first surface further comprises a plurality of third fine projections having a third height ranging from 80 to 120 nm and a density ranting from 10,000 to 30,000 per mm$^2$, and wherein the back surface further comprises a plurality of fine projections having a height ranging from 25 to 600 nm and a density ranging from 5,000,000 to 80,000,000 per mm$^2$.

* * * * *